(12) United States Patent
Clausen et al.

(10) Patent No.: US 7,815,083 B2
(45) Date of Patent: Oct. 19, 2010

(54) HITCH MOUNTED CARRIER

(75) Inventors: Eivind Clausen, Bellingham, WA (US); James D Allsop, Bellingham, WA (US)

(73) Assignee: Softride, Inc., Bellingham, WA (US)

( * ) Notice: Subject to any disclaimer, the term of this patent is extended or adjusted under 35 U.S.C. 154(b) by 204 days.

(21) Appl. No.: 11/925,016

(22) Filed: Oct. 26, 2007

(65) Prior Publication Data
US 2008/0099522 A1  May 1, 2008

Related U.S. Application Data

(60) Provisional application No. 60/854,803, filed on Oct. 27, 2006.

(51) Int. Cl.
*B60R 9/06* (2006.01)

(52) U.S. Cl. .................. 224/501; 224/497; 224/519; 224/521; 224/924

(58) Field of Classification Search ............ 224/497, 224/501, 506, 519, 521, 924
See application file for complete search history.

(56) References Cited

U.S. PATENT DOCUMENTS

| | | | |
|---|---|---|---|
| 2,512,267 A | 6/1950 | Donnelley | |
| 3,464,608 A | 9/1969 | Rodriguez | |
| 4,193,526 A * | 3/1980 | Rosmarinofski | 224/401 |
| 4,400,129 A | 8/1983 | Eisenberg | |
| 4,596,484 A * | 6/1986 | Nakatani | 403/104 |
| 4,679,717 A * | 7/1987 | Hansen | 224/509 |
| 4,830,250 A | 5/1989 | Newbold | |
| 5,181,822 A | 1/1993 | Allsop | |
| 5,232,134 A | 8/1993 | Allen | |
| 5,244,133 A | 9/1993 | Abbott | |
| 5,259,542 A | 11/1993 | Newbold | |
| 5,303,857 A | 4/1994 | Hewson | |
| 5,330,312 A | 7/1994 | Allsop | |
| 5,527,146 A | 6/1996 | Allsop | |
| 5,570,825 A | 11/1996 | Cona | |
| 5,573,165 A | 11/1996 | Bloemer | |
| 5,593,076 A | 1/1997 | Biondo | |

(Continued)

FOREIGN PATENT DOCUMENTS

EP  1059205 A1 * 12/2000

(Continued)

*Primary Examiner*—Nathan J Newhouse
*Assistant Examiner*—Adam Waggenspack
(74) *Attorney, Agent, or Firm*—Christensen O'Connor Johnson Kindness PLLC

(57) ABSTRACT

A carrier for bicycles or other objects which is adapted to be mounted in a hitch receiver of a vehicle. The carrier being adapted to pivot downwardly away from the rear of the vehicle to allow for improved access to the rear doors of the vehicle. The carrier including a cantilever mounted handle having a spring actuated locking member for holding the carrier in a horizontal or, vertically stored position, or, when released, allowing the carrier to tilt downwardly. The carrier including bicycle support members is adapted to grip the wheels of a bicycle mounted thereon. The bicycle support members are mounted on transverse members and are laterally adjustable to match the wheel span of a bicycle to be carried. The bicycle support members are adapted to be folded and the transverse members moved inwardly to make the carrier more compact for storage. In an alternative embodiment, a tiltable carrier rack is provided for carrying items other than bicycles.

11 Claims, 21 Drawing Sheets

U.S. PATENT DOCUMENTS

| | | |
|---|---|---|
| 5,658,119 A | 8/1997 | Allsop |
| 5,664,717 A | 9/1997 | Joder |
| 5,775,560 A * | 7/1998 | Zahn et al. ............. 224/524 |
| 5,938,093 A * | 8/1999 | Bloemer et al. .......... 224/553 |
| 6,047,869 A * | 4/2000 | Chiu ..................... 224/314 |
| 6,401,999 B1 | 6/2002 | Hehr |
| 6,431,423 B1 * | 8/2002 | Allen et al. ............. 224/509 |
| 6,460,743 B2 * | 10/2002 | Edgerly et al. .......... 224/324 |
| 6,604,658 B1 * | 8/2003 | Young et al. ............ 224/521 |
| 6,761,297 B1 * | 7/2004 | Pedrini .................. 224/519 |
| 6,929,163 B1 * | 8/2005 | Pedrini et al. ........... 224/506 |
| 7,104,430 B2 * | 9/2006 | Reeves .................. 224/536 |
| 2003/0071097 A1 * | 4/2003 | Dean ..................... 224/319 |
| 2005/0061842 A1 * | 3/2005 | Tsai ...................... 224/501 |
| 2009/0120984 A1 * | 5/2009 | Sautter et al. ........... 224/497 |

FOREIGN PATENT DOCUMENTS

| | | |
|---|---|---|
| WO | 2006004519 A1 | 1/2006 |

* cited by examiner

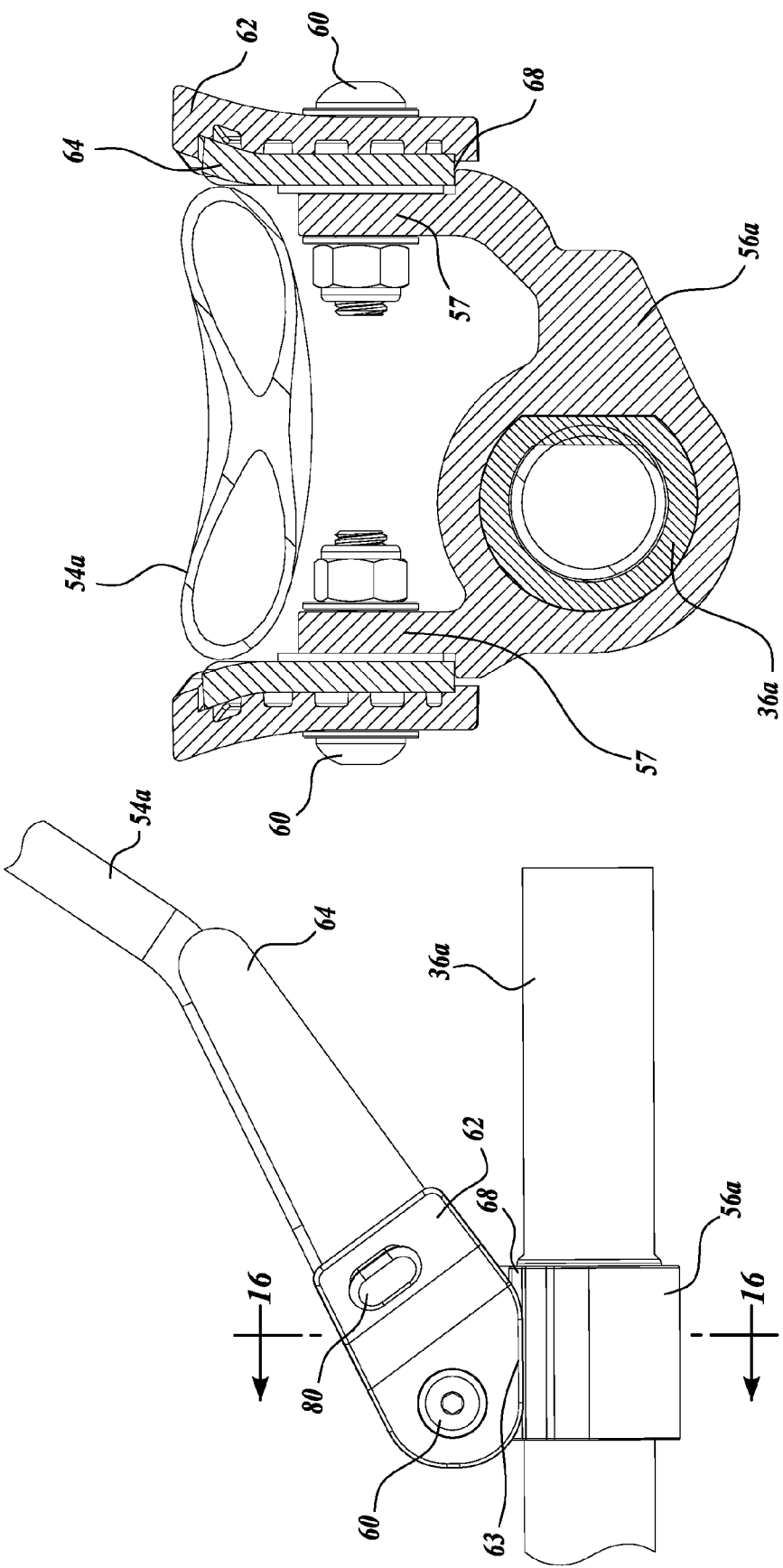

HITCH MOUNTED CARRIER

CROSS-REFERENCE TO RELATED APPLICATION

This application claims the benefit of U.S. Provisional Patent Application No. 60/854,803, filed Oct. 27, 2006, the subject matter of which is incorporated herein by reference.

BACKGROUND

The present invention relates to vehicle mounted carriers or racks and particularly to hitch mounted racks for carrying bicycles or other goods, the rack being pivotable upwardly when not in use and downwardly away from the vehicle to improve access to the rear doors of the vehicle.

Rearwardly tiltable vehicle hitch mounted support racks are known. See, for example, U.S. Pat. Nos. 5,181,822, 5,527, 146 and 5,658,119. In addition, hitch mounted support racks capable of tilting downwardly are also known, see for example International Publication No. WO2006/004519A1.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A carrier for mounting in a hitch receiver at the rear of a vehicle. The carrier including a first tube portion adapted to be inserted in the hitch receiver of the vehicle and a second beam portion adapted to carry bicycle mounting racks, or in another embodiment, a rack for carrying other loads. The first and second portions are pivotally connected to each other such that upon actuation of a pivoting lever, the bicycle or load carrying portion may be tilted downwardly to improve access to the rear storage area of a vehicle. The bicycle carrier includes foldable loops for holding the front and rear wheels of a bicycle, the loops are mounted on laterally adjustable tube structures. When not in use, the loops may be folded inwardly and the tubes moved laterally inward to compress the size of the carrying rack. The beam portion of the rack may also be pivoted upwardly to reduce the length of its extension rearwardly from the vehicle. The tilt or pivot control lever includes a spring actuated locking pin extending through the beam and adapted to mate with spaced receiving holes in an adjacent plate for holding the carrier in its horizontal or vertical position or, when released, allowing the carrier to tilt downwardly.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 15 is a side elevation view of the wheel holding loop mount of FIG. 14;

FIG. 16 is a section view taken along line 16-16 of FIG. 15;

DETAILED DESCRIPTION

Figure 5:
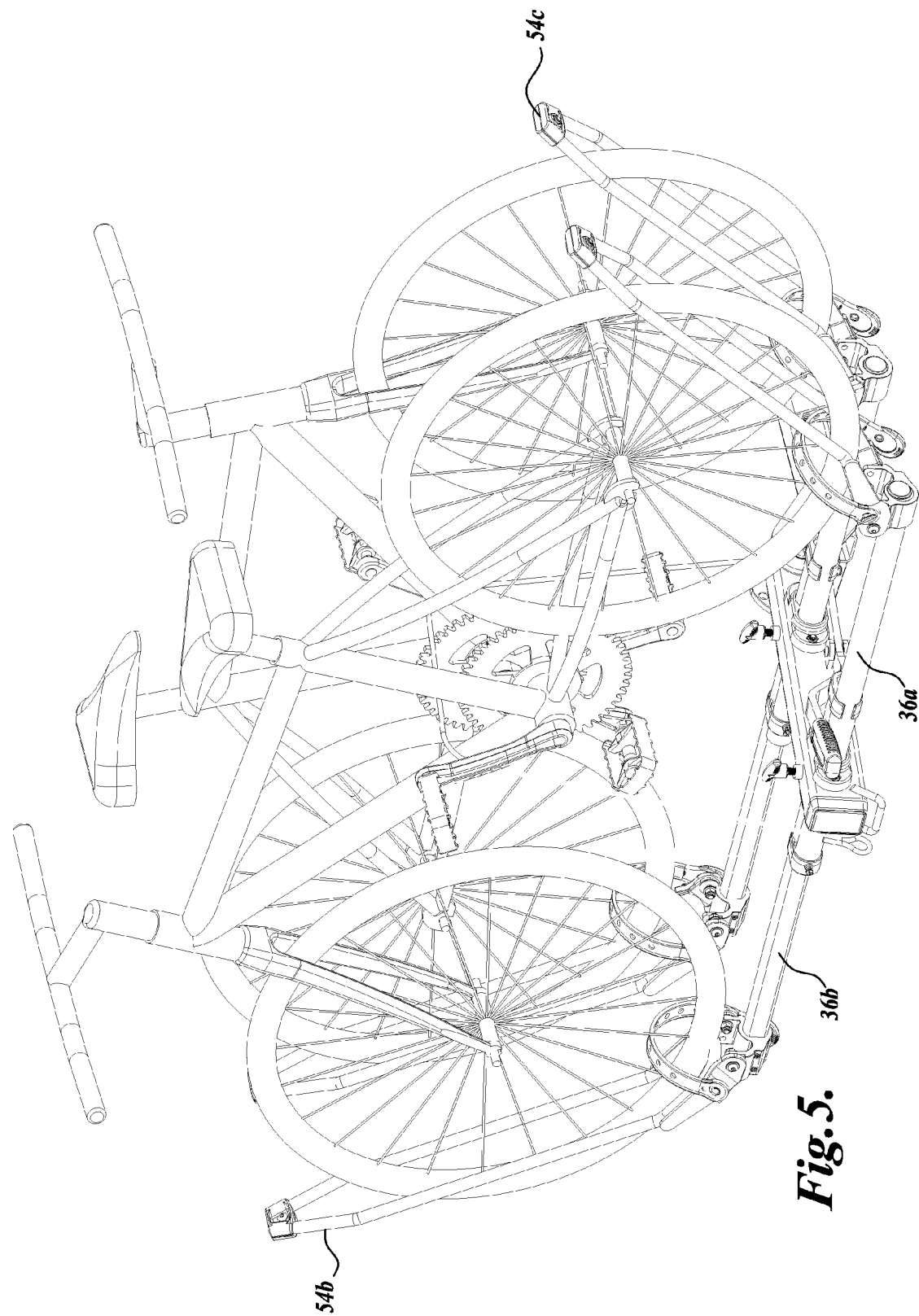
FIG. 5 is a perspective view showing a pair of bicycles mounted in the carrier.
Figure 8:
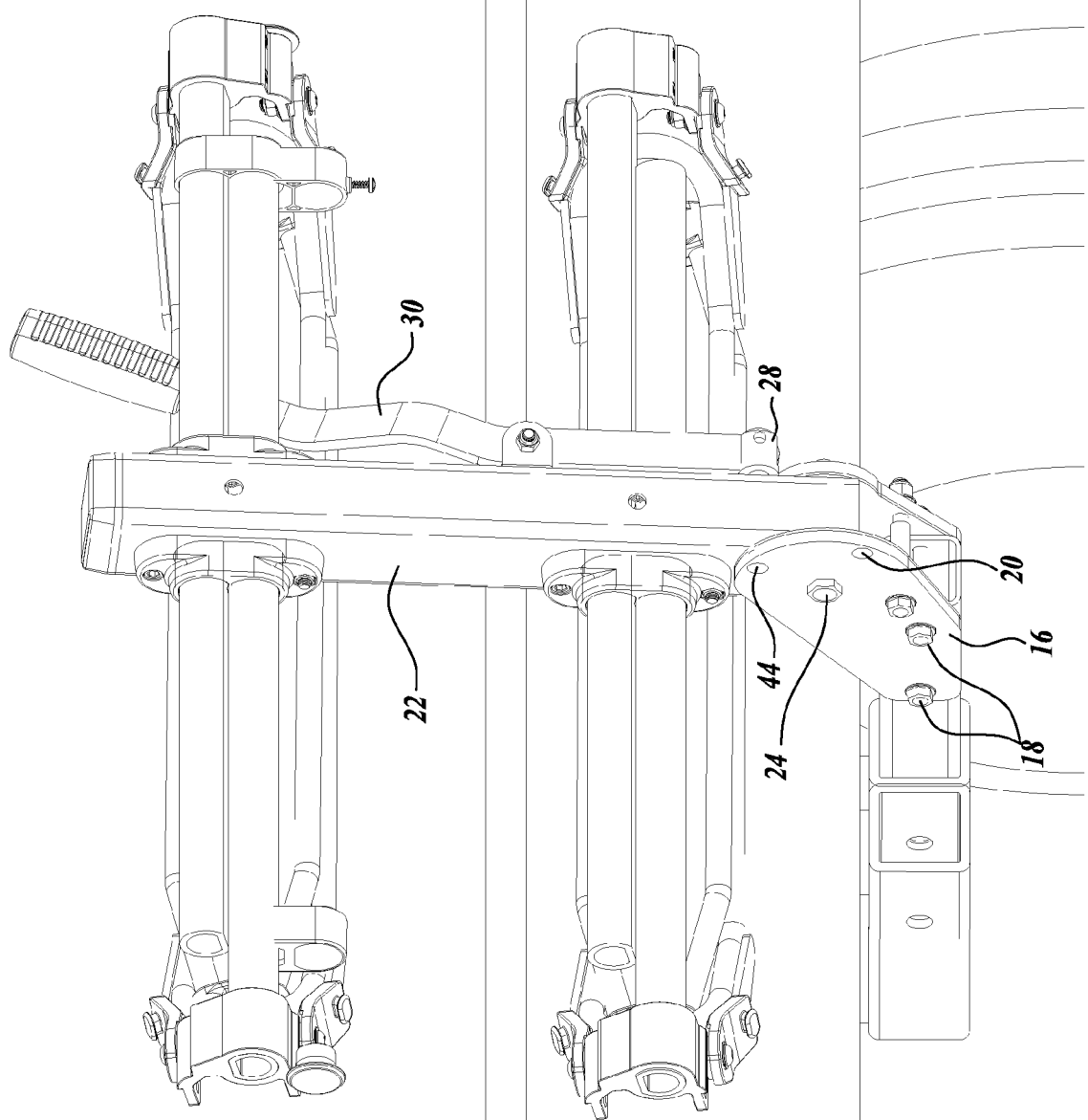
FIG. 8 is a perspective view of the bicycle carrier shown folded in its upright position.

Referring initially to FIGS. 1-5, a first embodiment of a carrier 10 adapted to be mounted in a hitch receiver at the rear of a vehicle is disclosed. As illustrated in FIG. 5, carrier 10 is adapted to hold two bicycles for transport behind a vehicle. It will be understood that the carrier can also be designed for holding more or less than two bicycles. Bicycle rack 10 includes a first tubular hitch mount 12 which is adapted to slide within and be locked to a hitch receiver mounted at the rear of a vehicle. Referring additionally to FIGS. 6-10, tube 12 is connected to plates 14 and 16 by means of conventional nut, bolt, and washer sets 18, for example, or may be welded thereto. As seen in FIG. 8 and other views, plate 16 extends further rearward and upward with respect to plate 14 to define a non-overlapping portion which includes additional holes 20 and 44 which, as will be described hereafter, are adapted to receive a locking pin.

Figure 10:
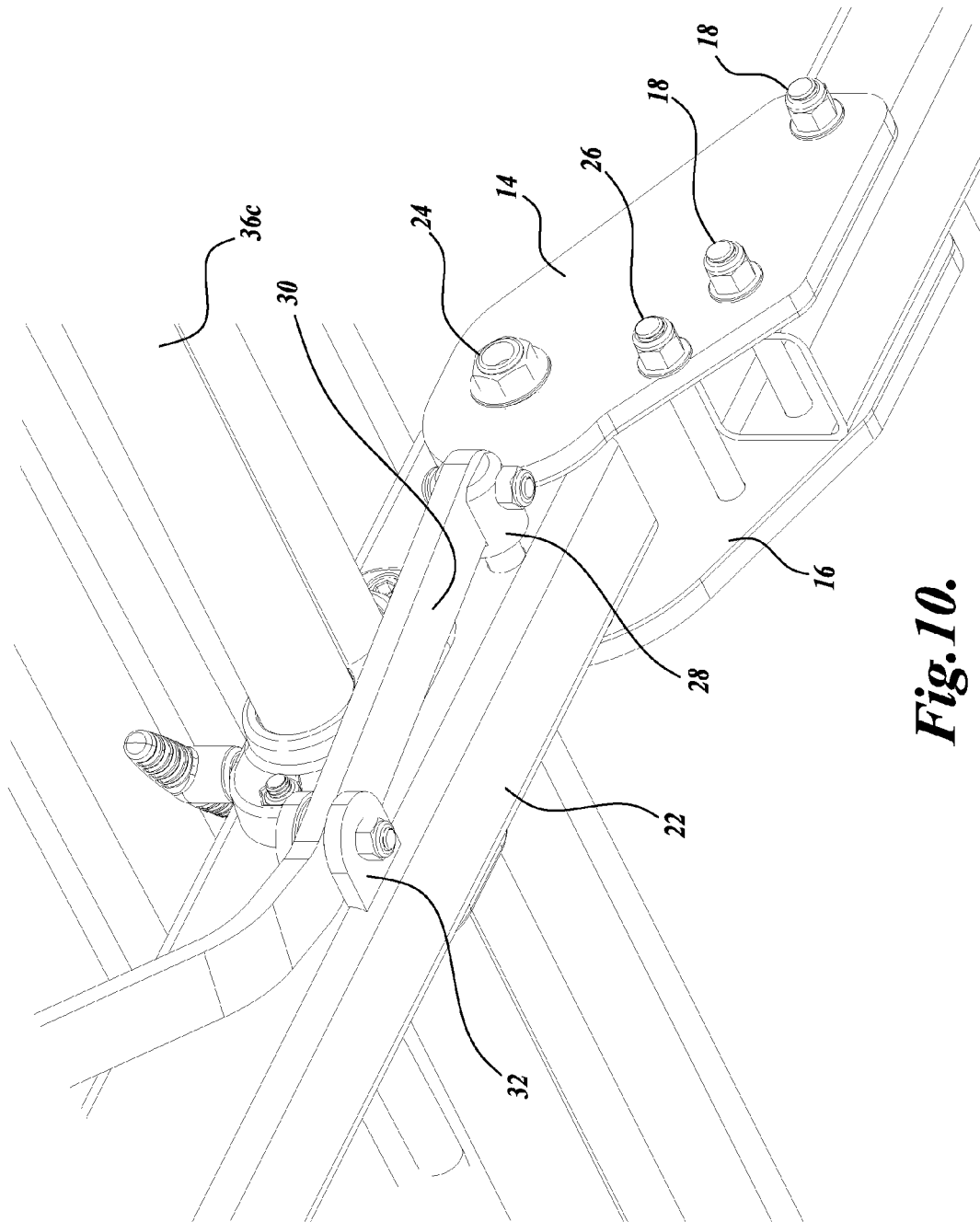
FIG. 10 is a partial upward perspective view of the tilting mechanism and spring lock of the present invention.
Figure 11:
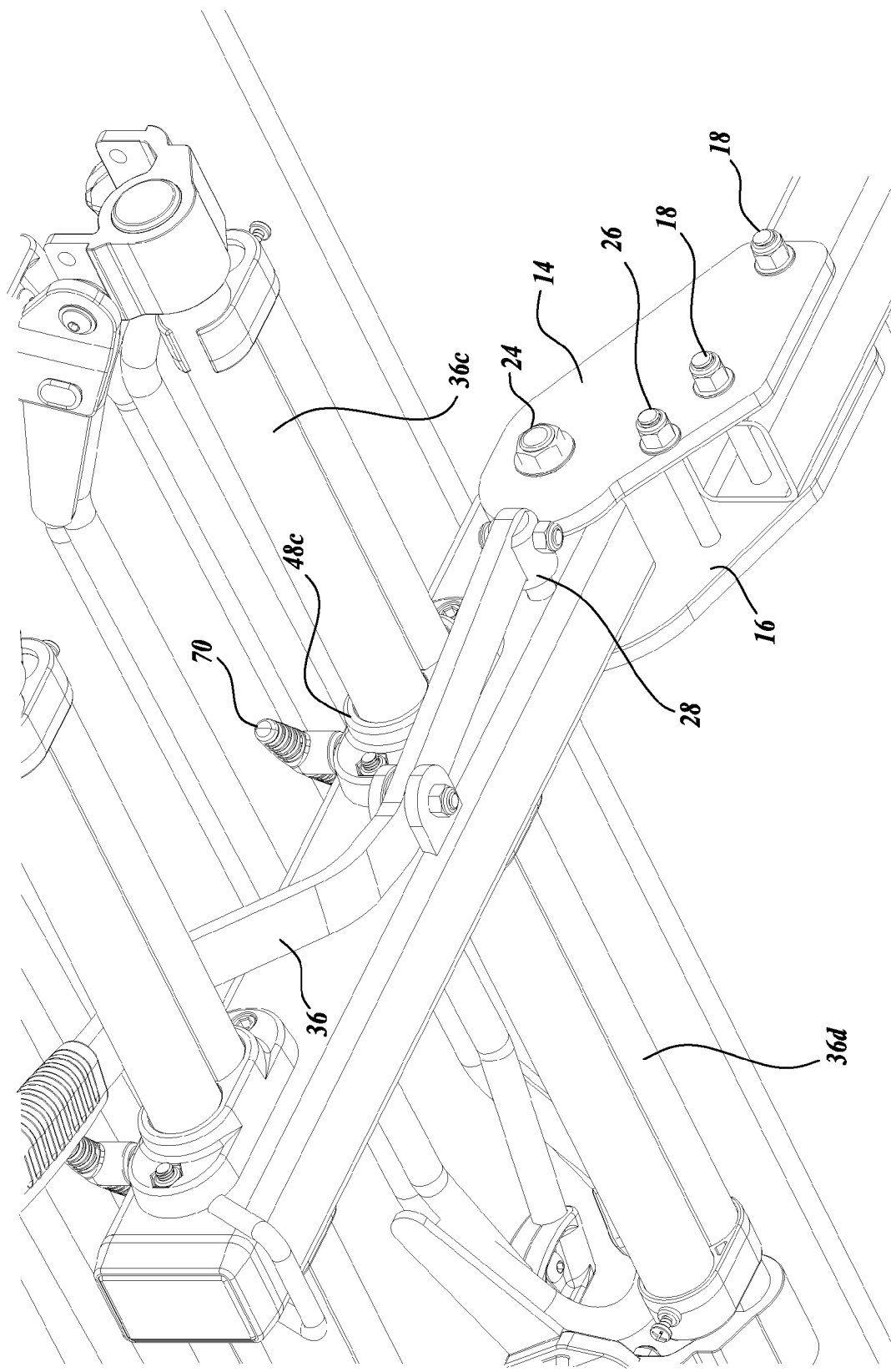
FIG. 11 is an upward perspective view of the bicycle carrier of the present invention.

As shown, plates 14 and 16 are interconnected with beam 22 by means of nut, bolt, and washer set 24 about which beam 22 may pivot both upwardly and downwardly. Other pivotal interconnecting means may alternatively be used. As best seen in FIG. 10, nut, bolt, and washer set 26 extends between plates 14 and 16 and acts as a stop to the downward pivoting of beam 22 as will be described hereafter.

Figure 1:
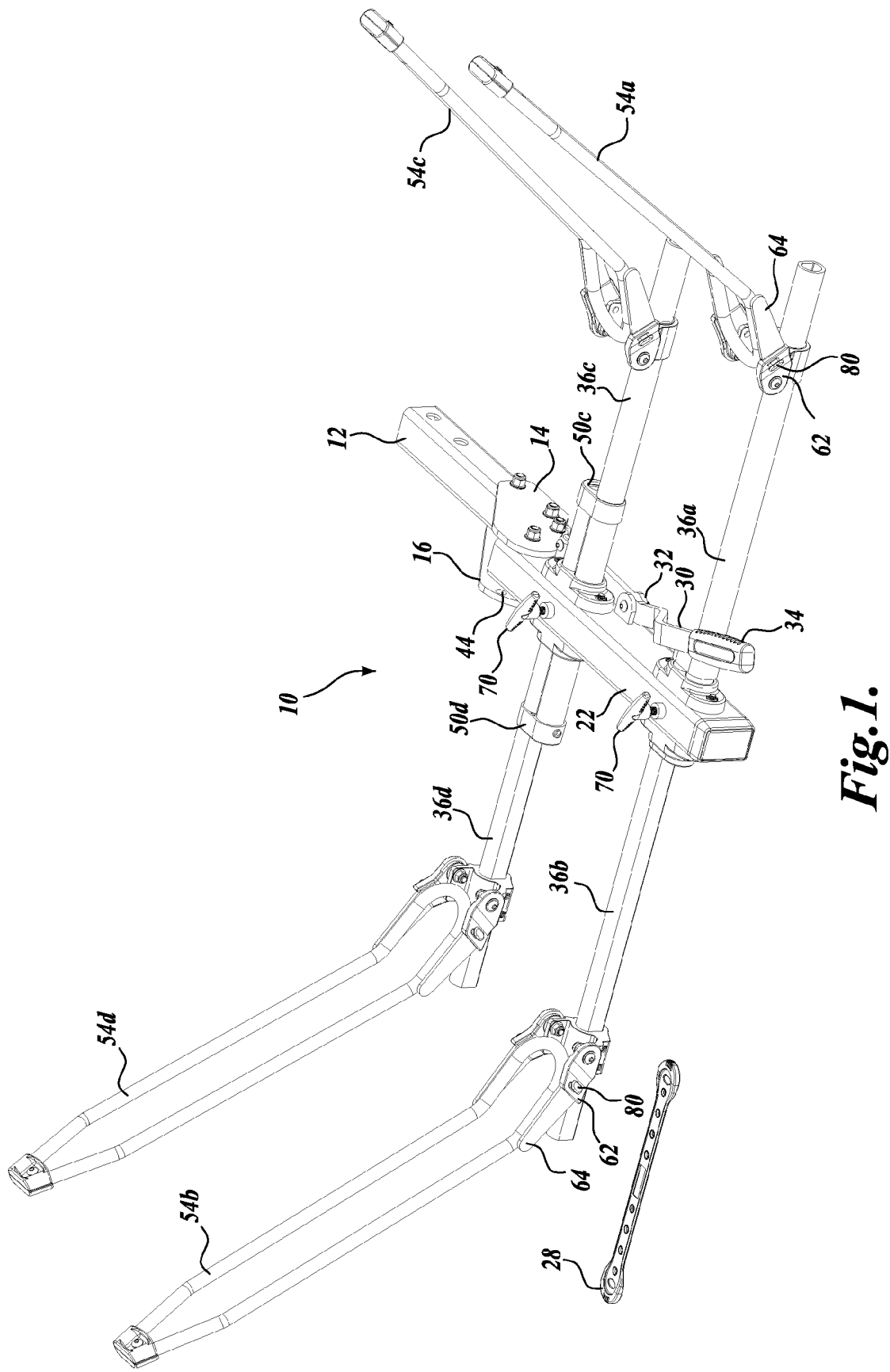
FIG. 1 is a perspective view of the hitch mounted bicycle carrier of the present invention.
Figure 2:
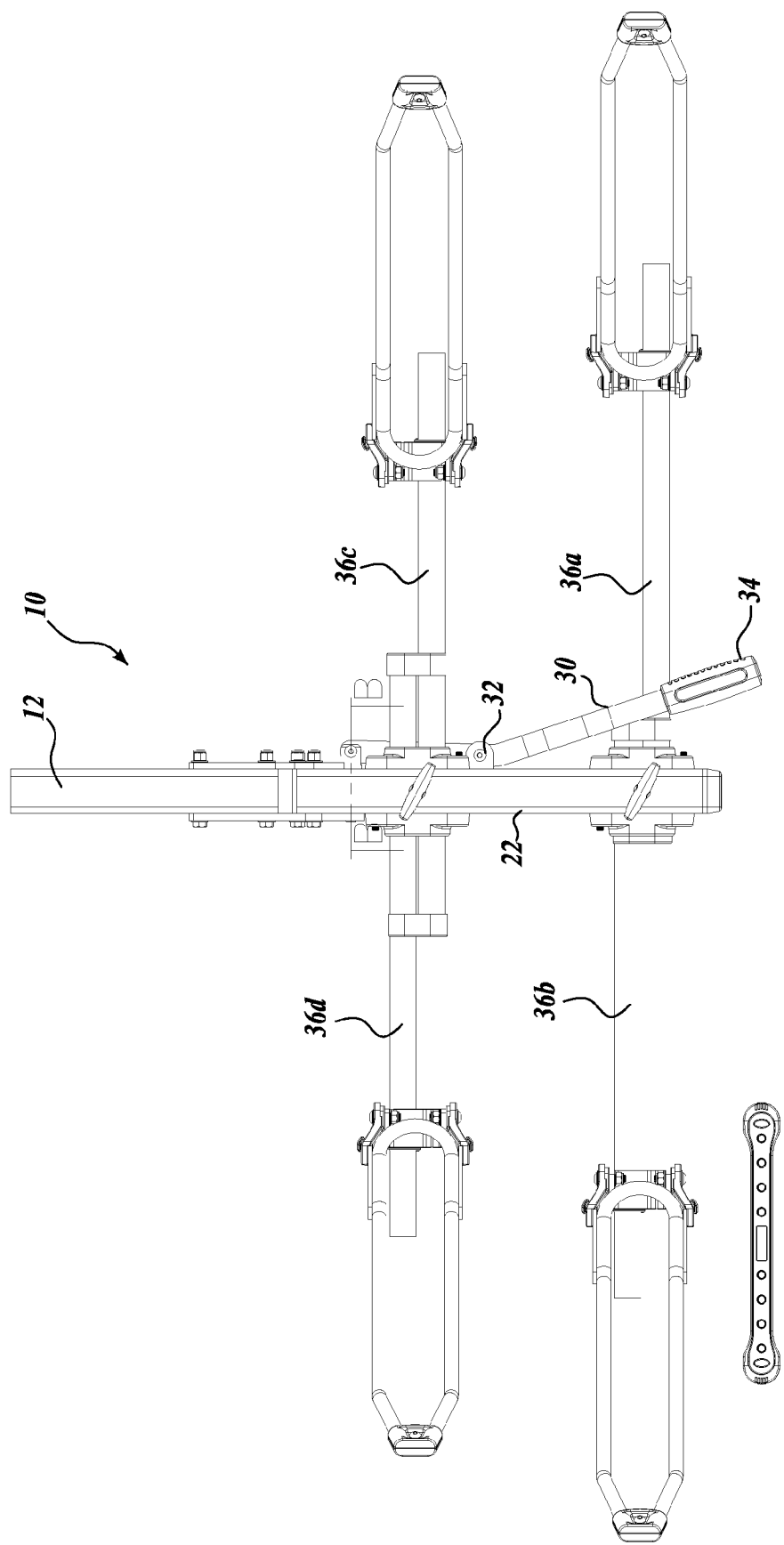
FIG. 2 is a top plan view of the bicycle carrier of FIG. 1.
Figure 3:
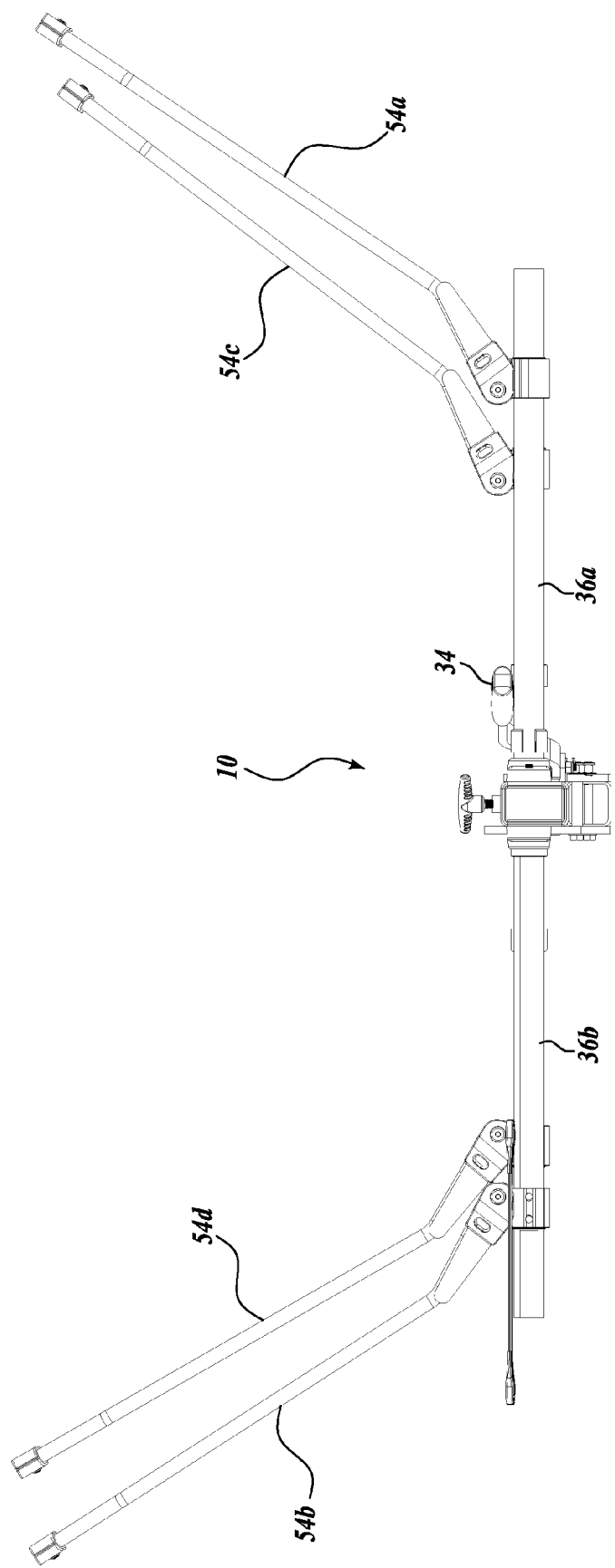
FIG. 3 is a rear elevation view of the embodiment of FIG. 2.
Figure 4:
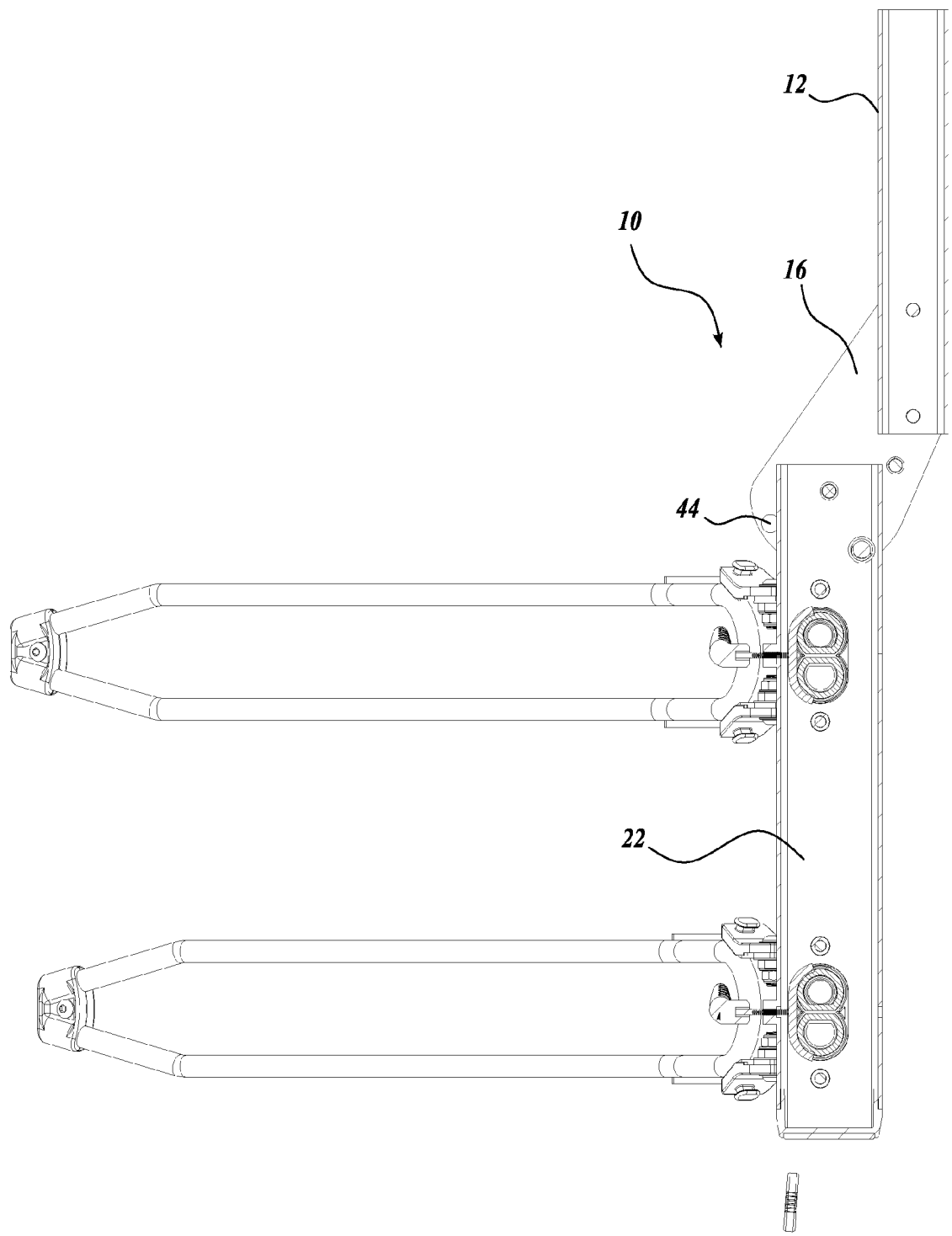
FIG. 4 is a right side elevation view of the embodiment of FIG. 2.
Figure 17:
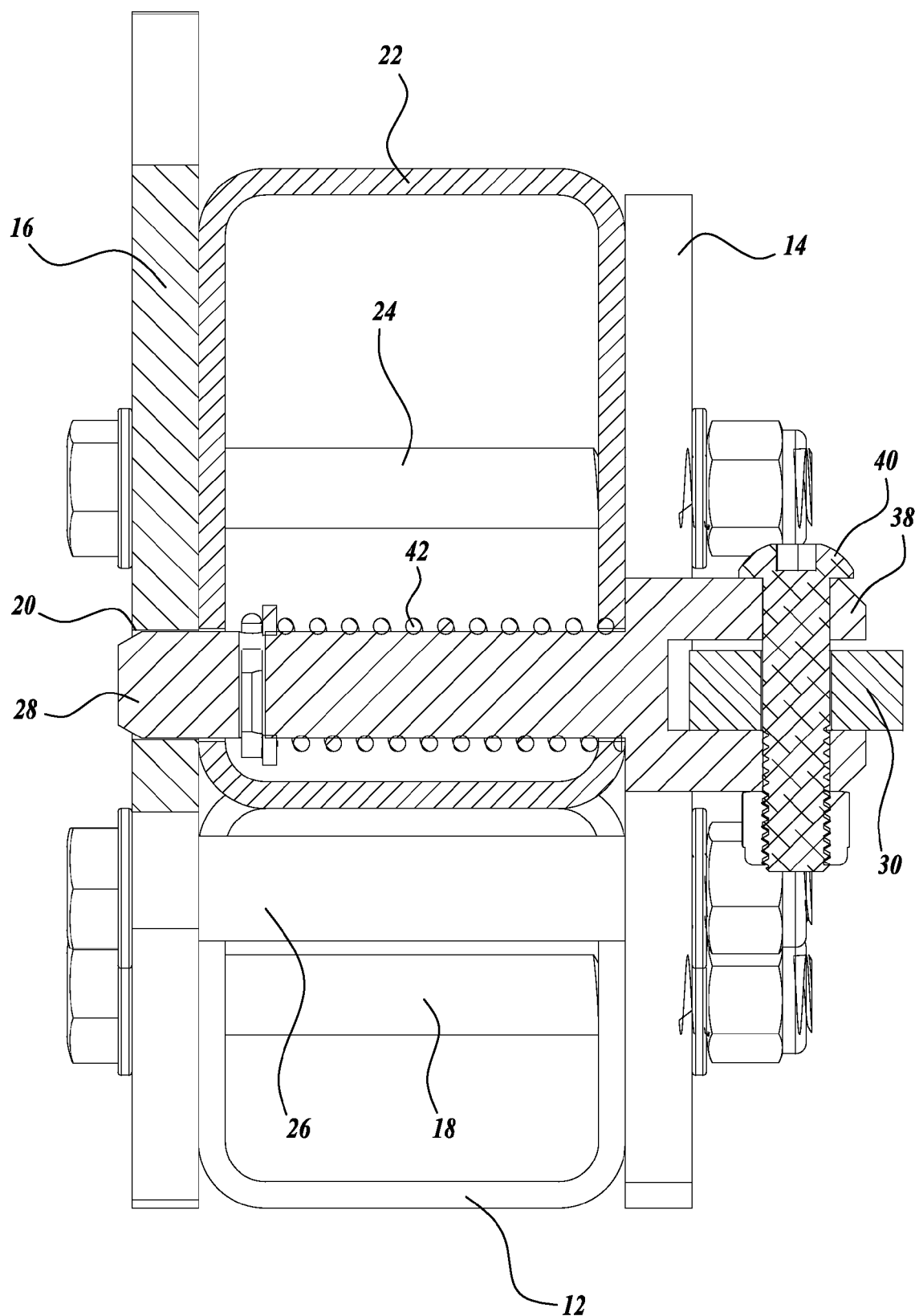
FIG. 17 is a cross sectional view of the locking pin and spring assembly of the present invention.
Figure 18:
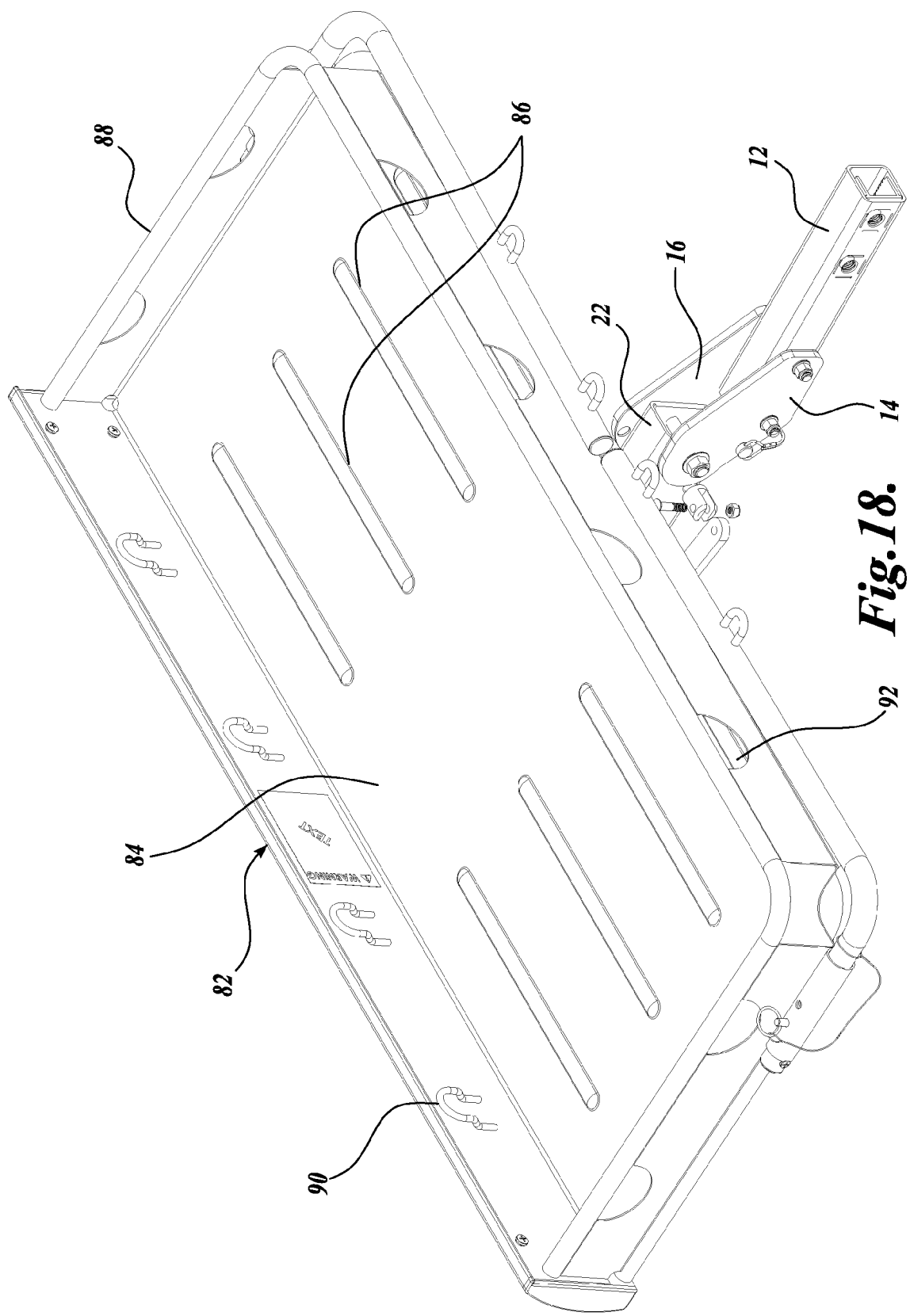
FIG. 18 is a downward perspective view of a second carrying rack embodiment of the present invention.
Figure 19:
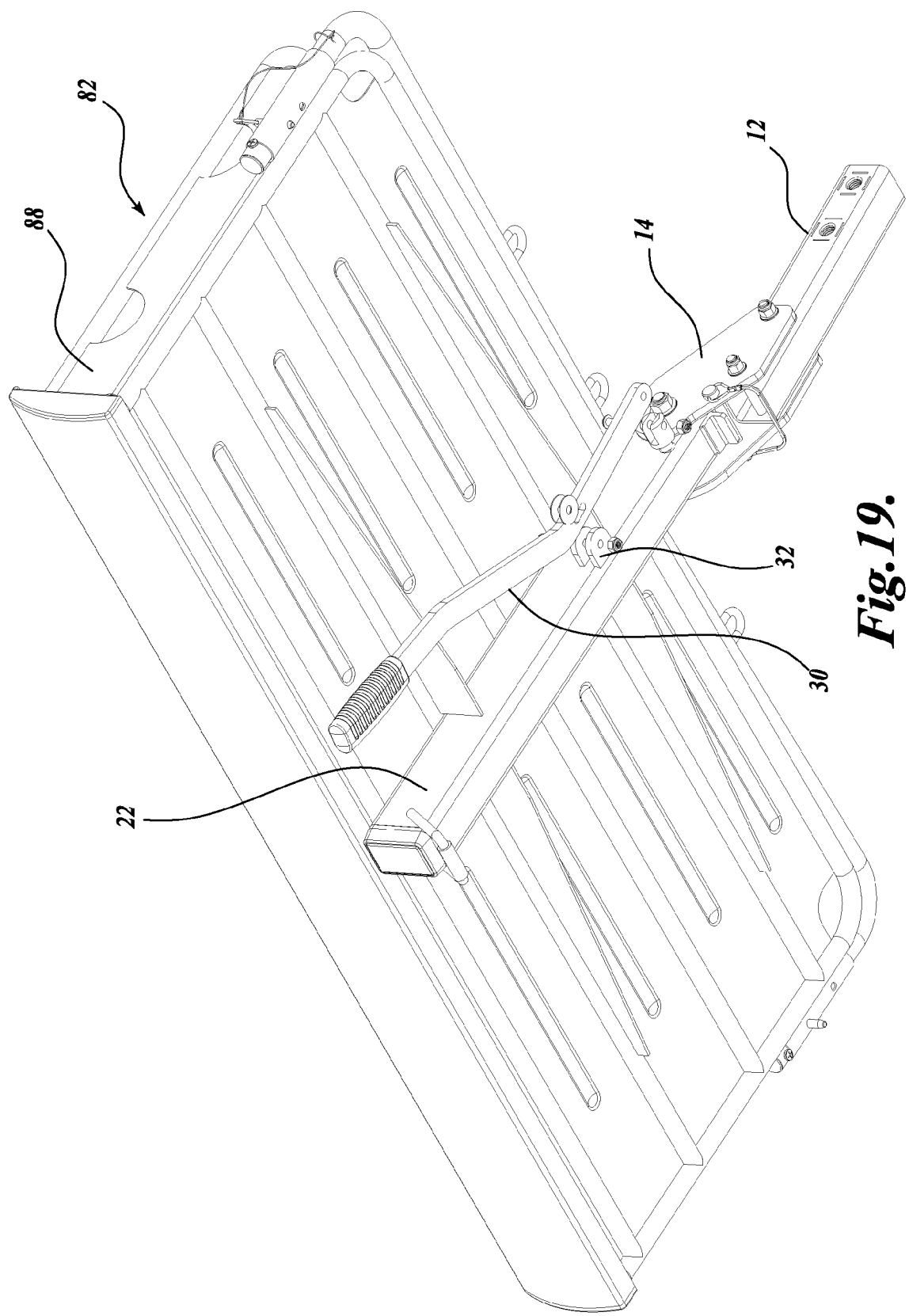
FIG. 19 is an upward perspective view showing the bottom of the embodiment of FIG. 18.
Figure 20:
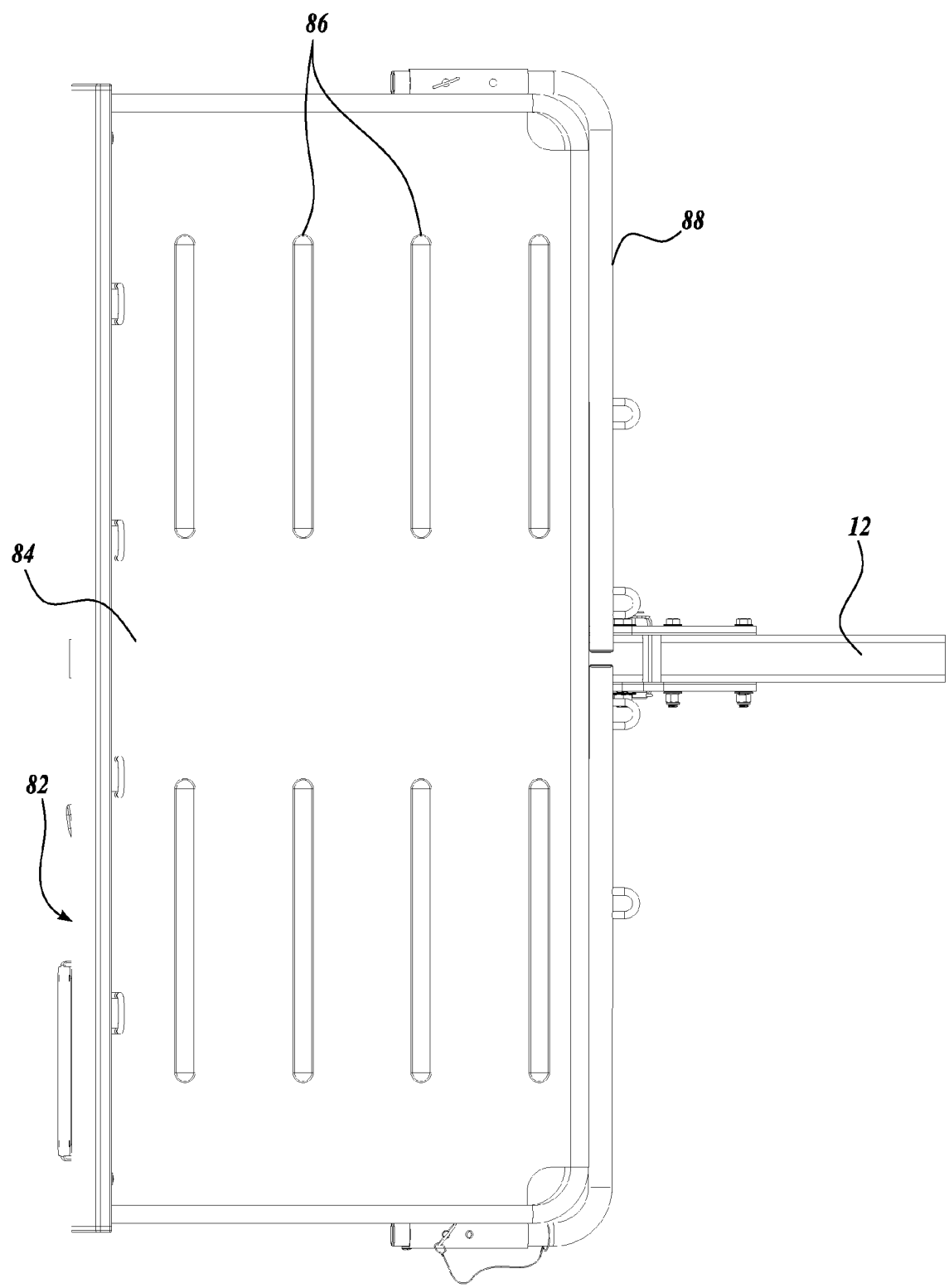
FIG. 20 is a top plan view of the embodiment of FIG. 18.
Figure 21:
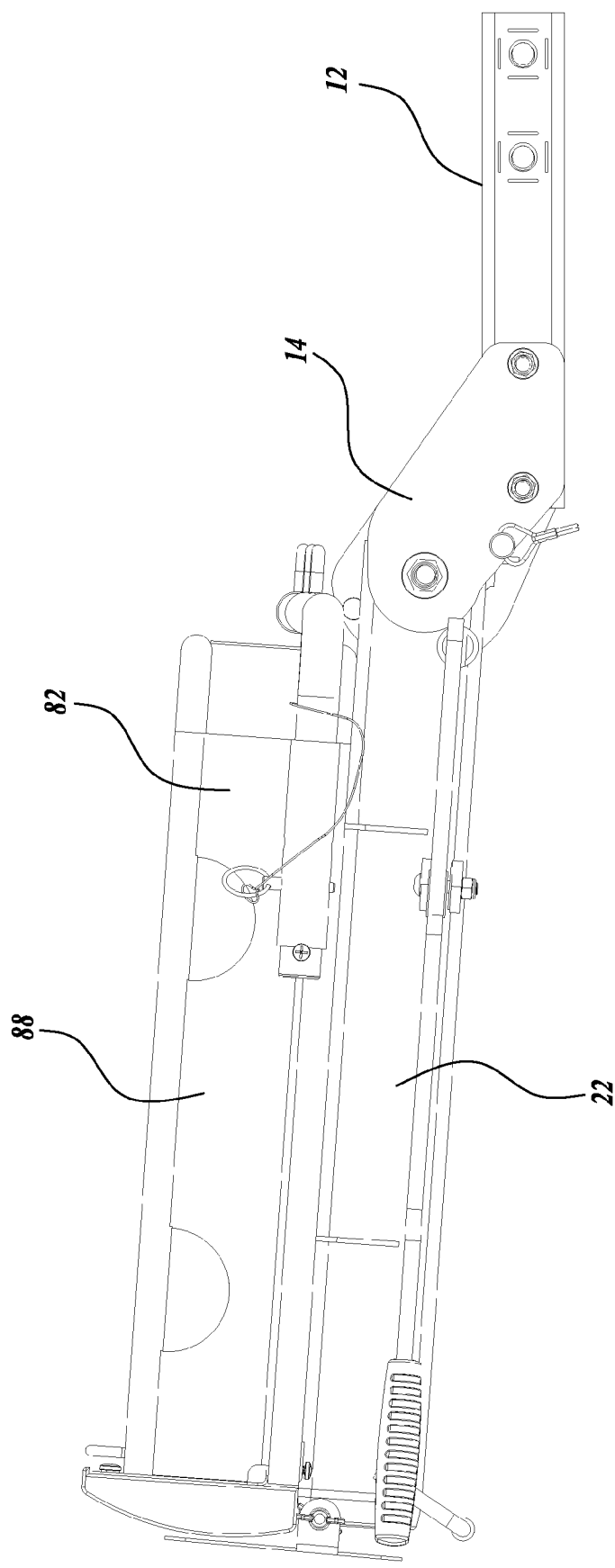
FIG. 21 is a side elevation view of the embodiment of FIG. 18.
Figure 22:
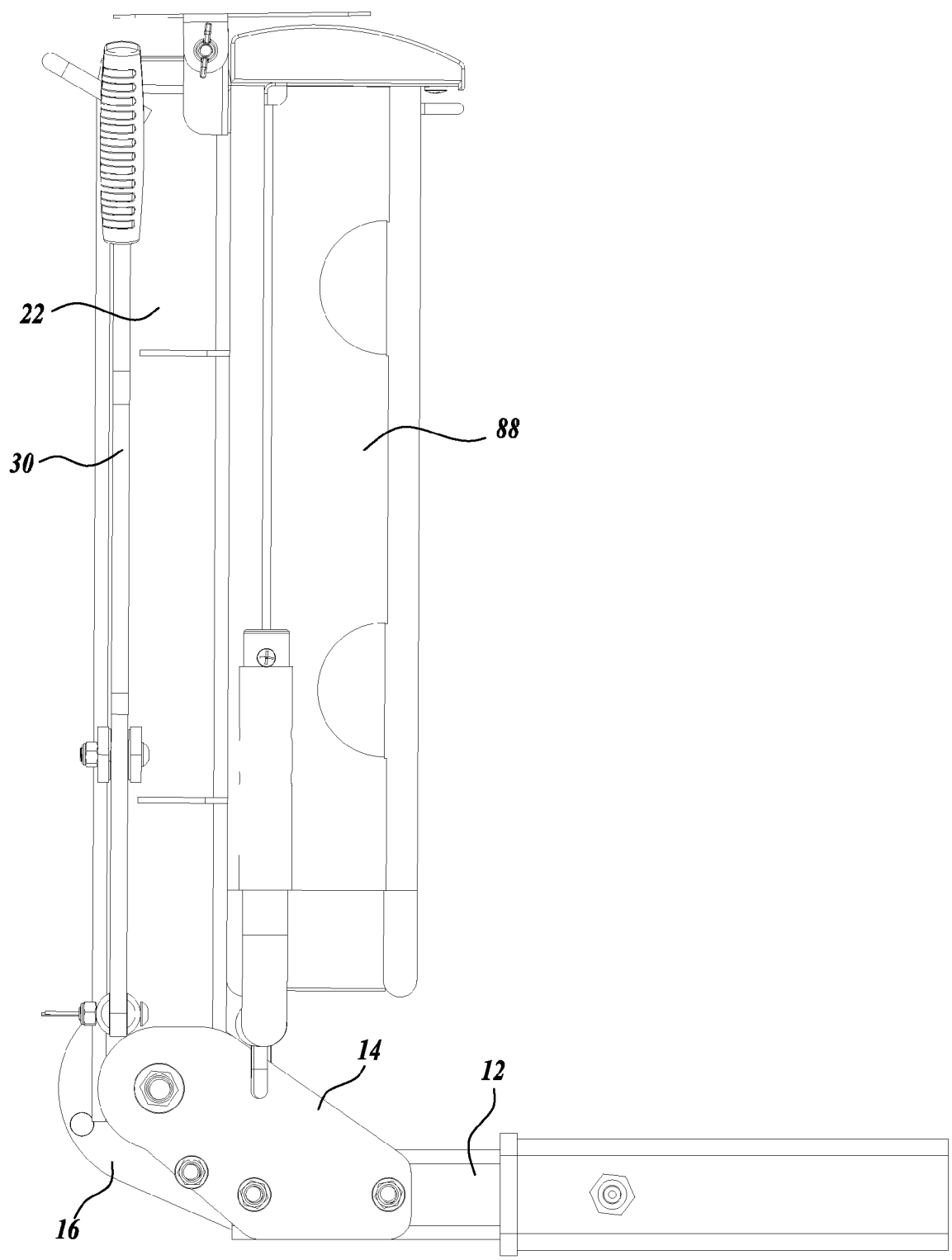
FIG. 22 is a side elevation view of the rack of FIG. 18 in its upwardly pivoted position.

Referring additionally to FIG. 17, lock pin 28 is shown extending through beam 22 and hole 20 in the non-overlapping portion of plate 16 to hold beam 22 in its horizontal position. Lock pin 28 is mounted on the distal end of cantilever mounted handle 30. As seen in FIG. 1, handle 30 extends rearwardly from a pivot mount 32 and may include an upward bend such that handgrip portion 34 is positioned above the bicycle support tubes 36*a* and 36*b* for easy access, while the distal end of handle 30 runs below bicycle support tubes 36*c* and 36*d*.

Referring again to FIG. 17, lock pin 28 is shown to include a split end 38 including a mounting hole through which a pin such as nut and bolt combination 40 extends to hold the distal end of handle 30 in place. It will be understood that lateral movement of handgrip 34 toward beam 22 causes lock pin 28 to move out of hole 20 in plate 16, thus unlocking beam 22 and allowing it to be pivoted either upwardly or downwardly as desired. As lock pin 28 moves outwardly, it compresses spring 42 such that lock pin 28 tends to automatically seat itself either back in hole 20 when the beam is moved to its horizontal position or into hole 44 when it is moved to its upright storage position.

Figure 13:
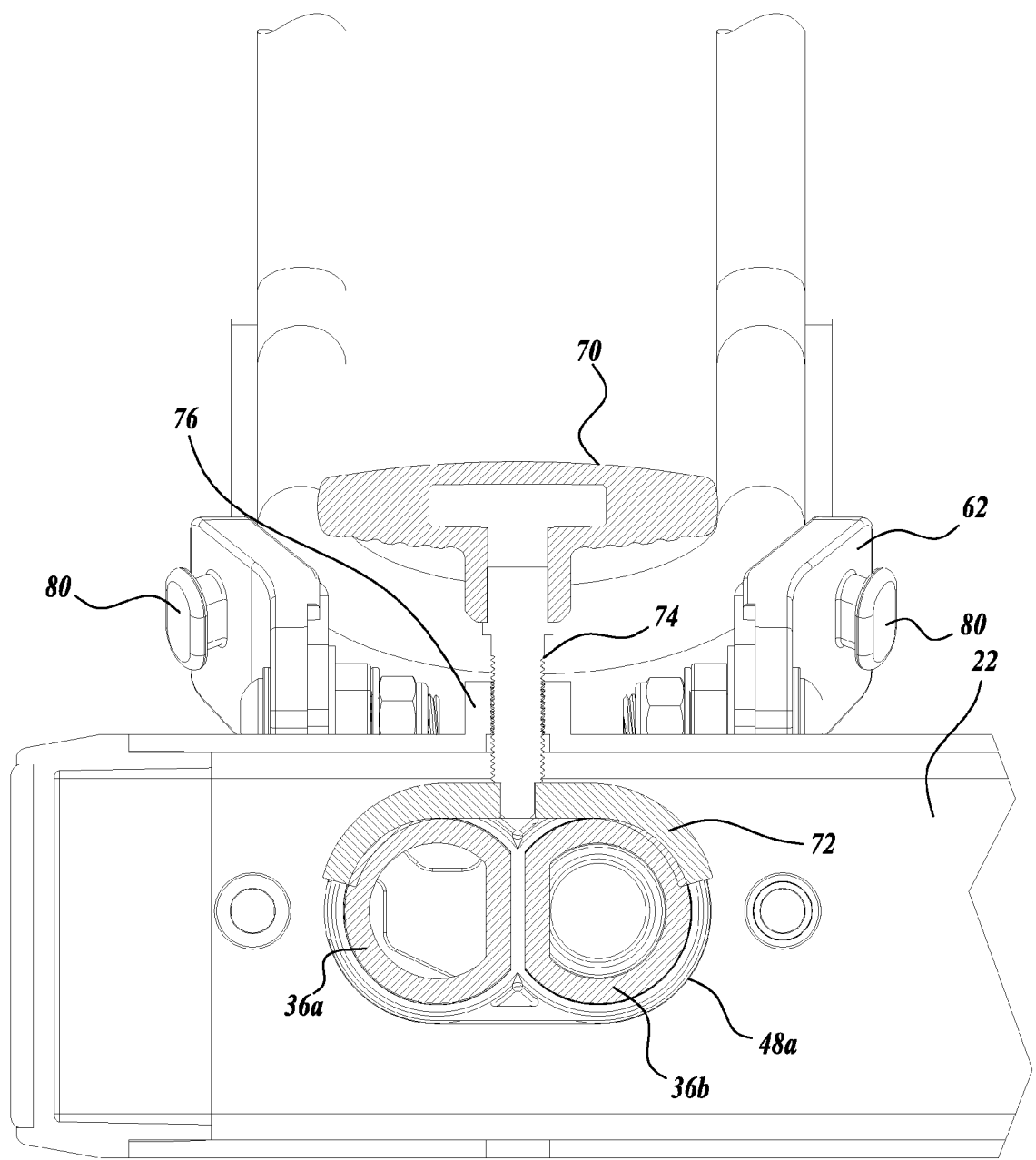
FIG. 13 is a partial section view showing the transverse rod gripping mechanism.

Referring additionally to FIG. 13, it will be seen that the bicycle support rods 36*a*-36*d* are substantially circular in cross-section but include a flat side which prevents the tubes from rotating in their mounts in beam 22. Rods 36*a*-36*d* may be solid or hollow tubes and may be formed in other cross-sections such that they cannot rotate with respect to each other when in contact.

Figure 6:
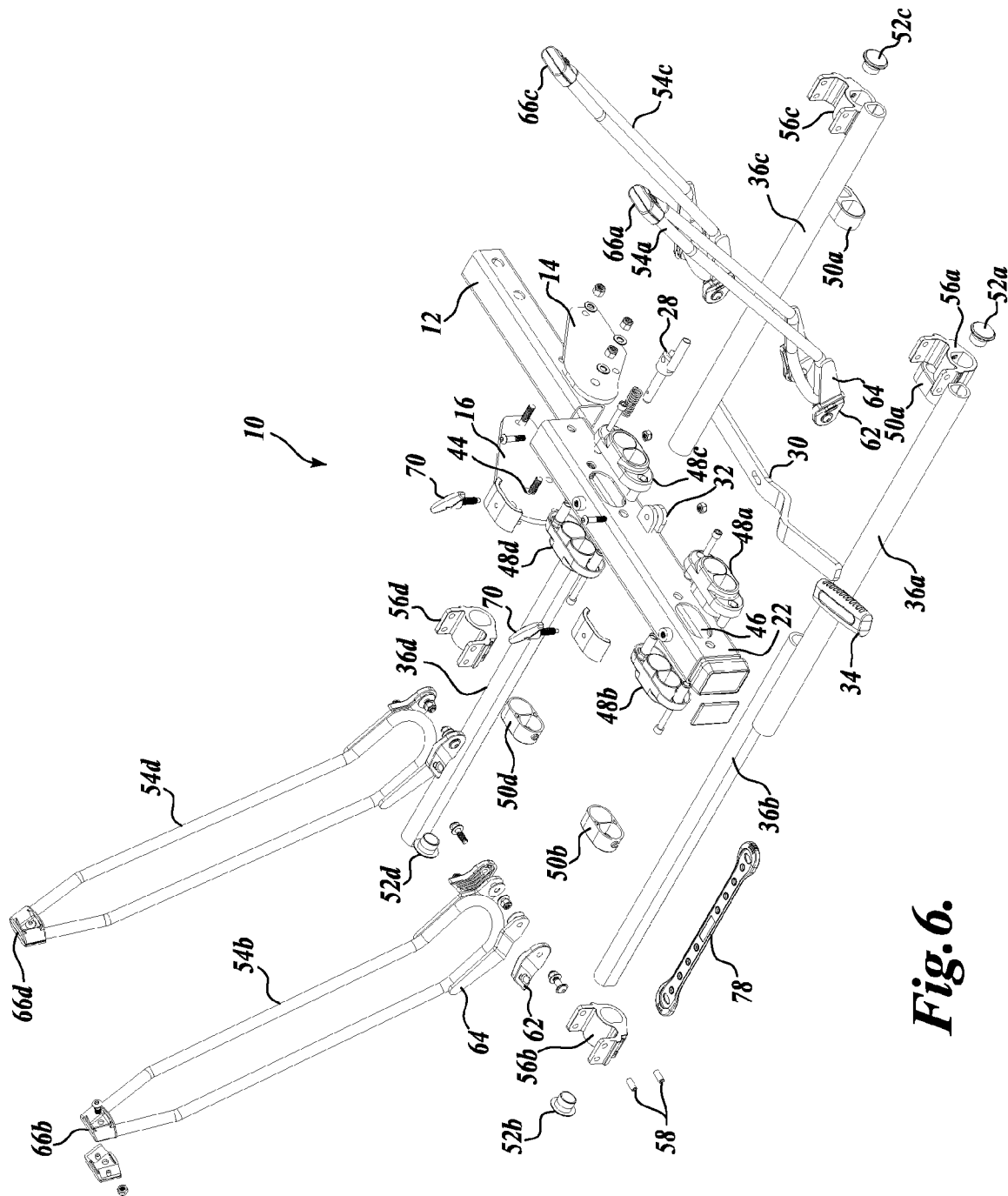
FIG. 6 is an exploded perspective view of the bicycle rack of FIG. 1.
Figure 7:
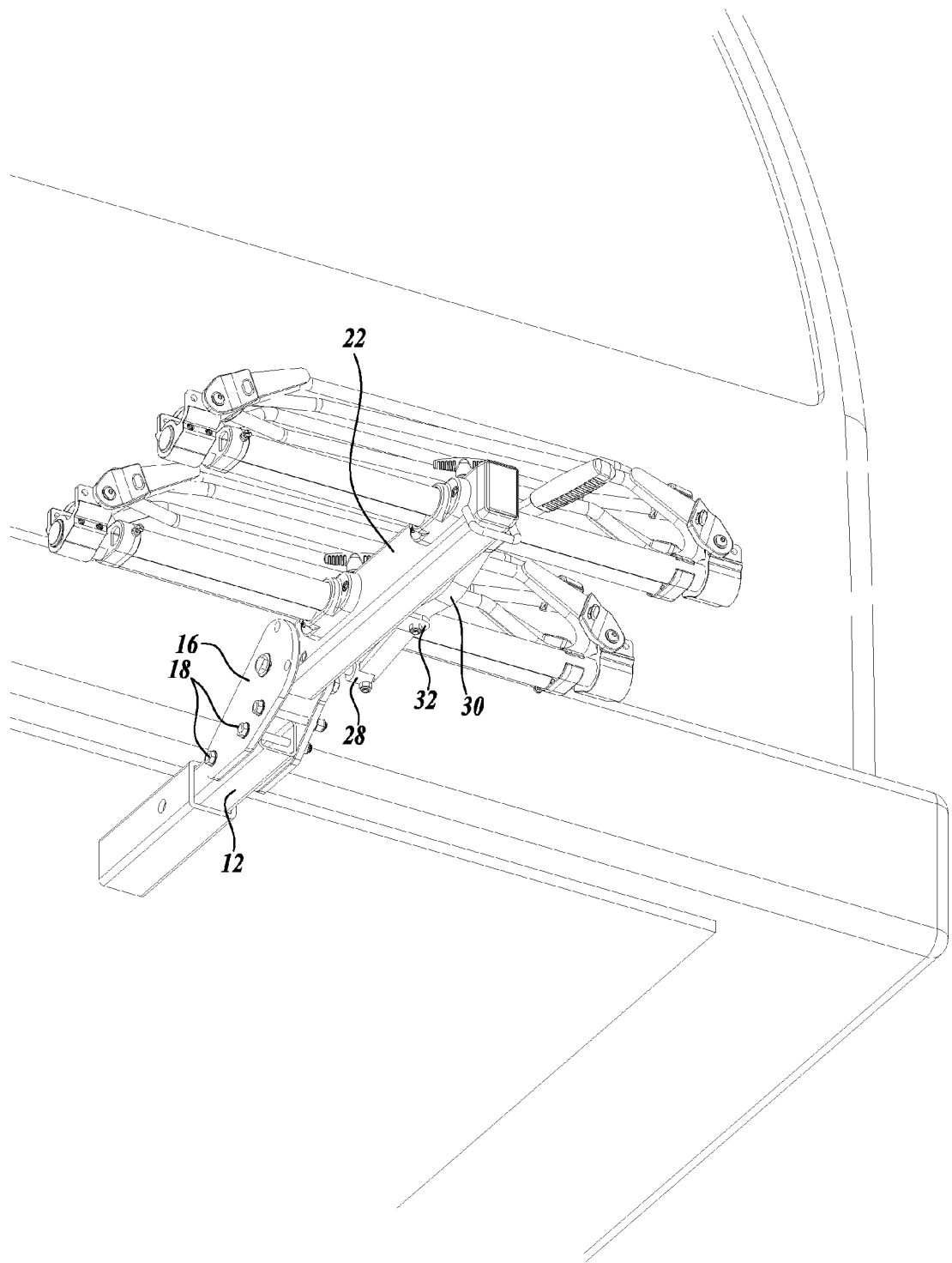
FIG. 7 is a perspective view showing the bicycle carrier of FIG. 1 in its folded position.

As seen in FIG. 6, through holes 46 are formed in beam 22 into which bicycle support rod receiving fittings 48 are mounted. Fittings 48 act to align bicycle support tubes or rods 36 as they pass through beam 22. As shown in FIGS. 1 and 6, for example, each of rods 36*a*-*d* include an end fitting 50*a*-50*d* which fitting includes a tube end mounting portion and an adjacent "C"-shaped section through which the adjacent tube or rod 36 runs. Fittings 50 assist in maintaining the alignment of the adjacent bicycle support tubes 36 when under load. End plugs 52*a*-52*d* may also be provided for tubes 36*a*-*d*.

Figure 14:
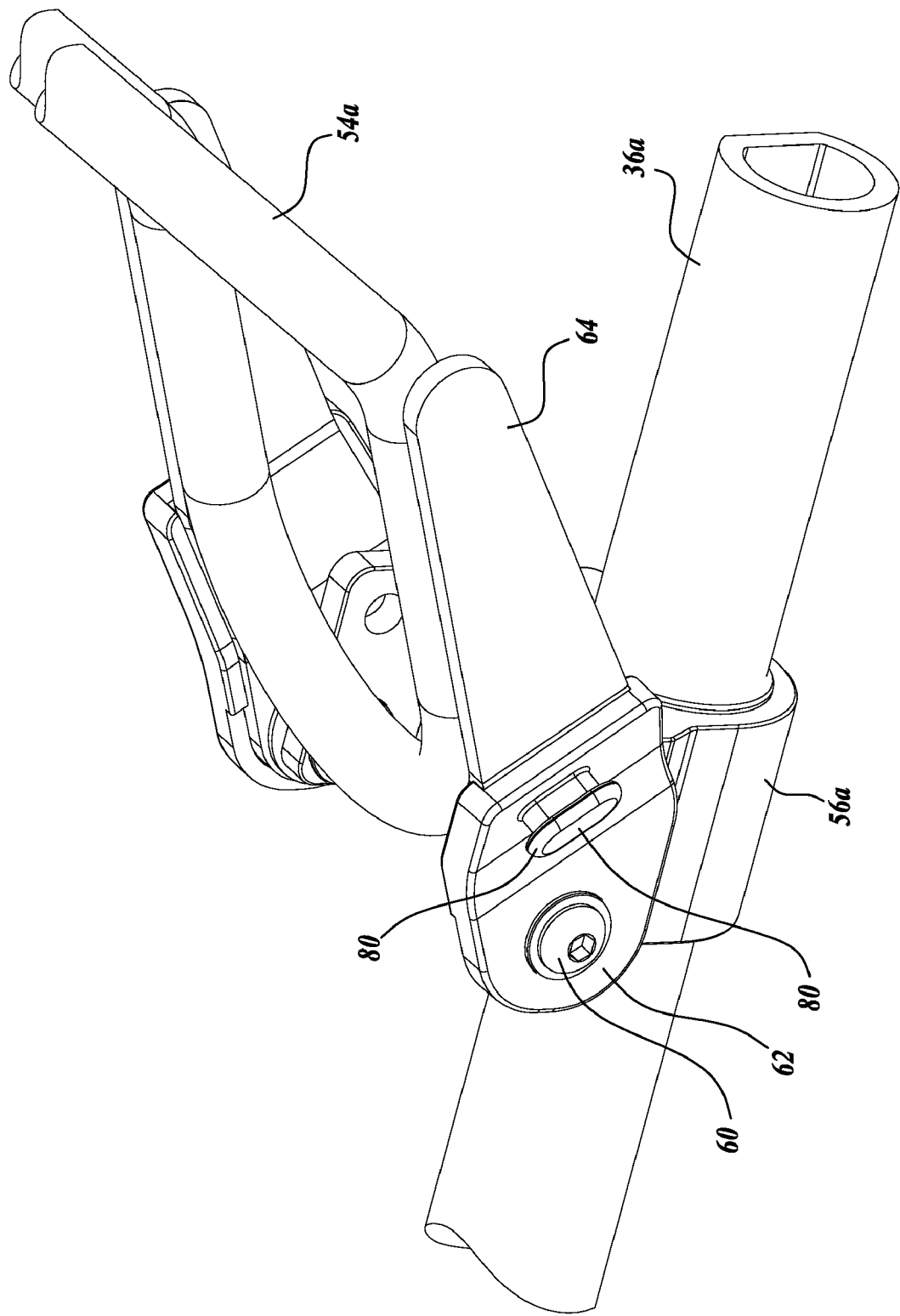
FIG. 14 is a partial perspective view of the wheel holding loop mount of the embodiment of FIG. 1.

Referring to FIGS. 14-16, the construction of one embodiment of the pivotable bicycle wheel support loops 54*a*-54*d* and their mounts will now be discussed. As is perhaps best seen in FIGS. 6 and 16, the bicycle support loops each include a first tubular mount 56 which is adapted to be slid upon tube 36 and fixed in place by means of set screws 58 (FIG. 6). Mount 56 includes a pair of upwardly extending ears 57 having holes therein adapted to receive nut, bolt, and washer combinations 60, to hold fitting 62 and loop support 64 such that supports 64 and their associated loops 54 are adapted to pivot and therearound.

Loops 54 may be made of aluminum tubing or other suitable material and are connected to loop supports 64 by welding or other conventional means. In the disclosed embodiment, loops 54 are closed at their upper ends by means of plastic fittings 66 but other obvious variations such as a continuous loop or a loop open at its bottom are also contemplated.

Tubular mounts 56 include a pair of outwardly extending flanges 68 (FIGS. 15 and 16), which contact a flat surface 63 of fitting 62 when loop 54 is pivoted upwardly and outwardly, thus, limiting the angular pivotability of loop 54. It will be understood that loops 54 are adapted to pivot from a substantially horizontal inwardly pointing stored position to an upwardly extending position such as shown in FIG. 1, for receiving a bicycle to be carried.

Figure 9:
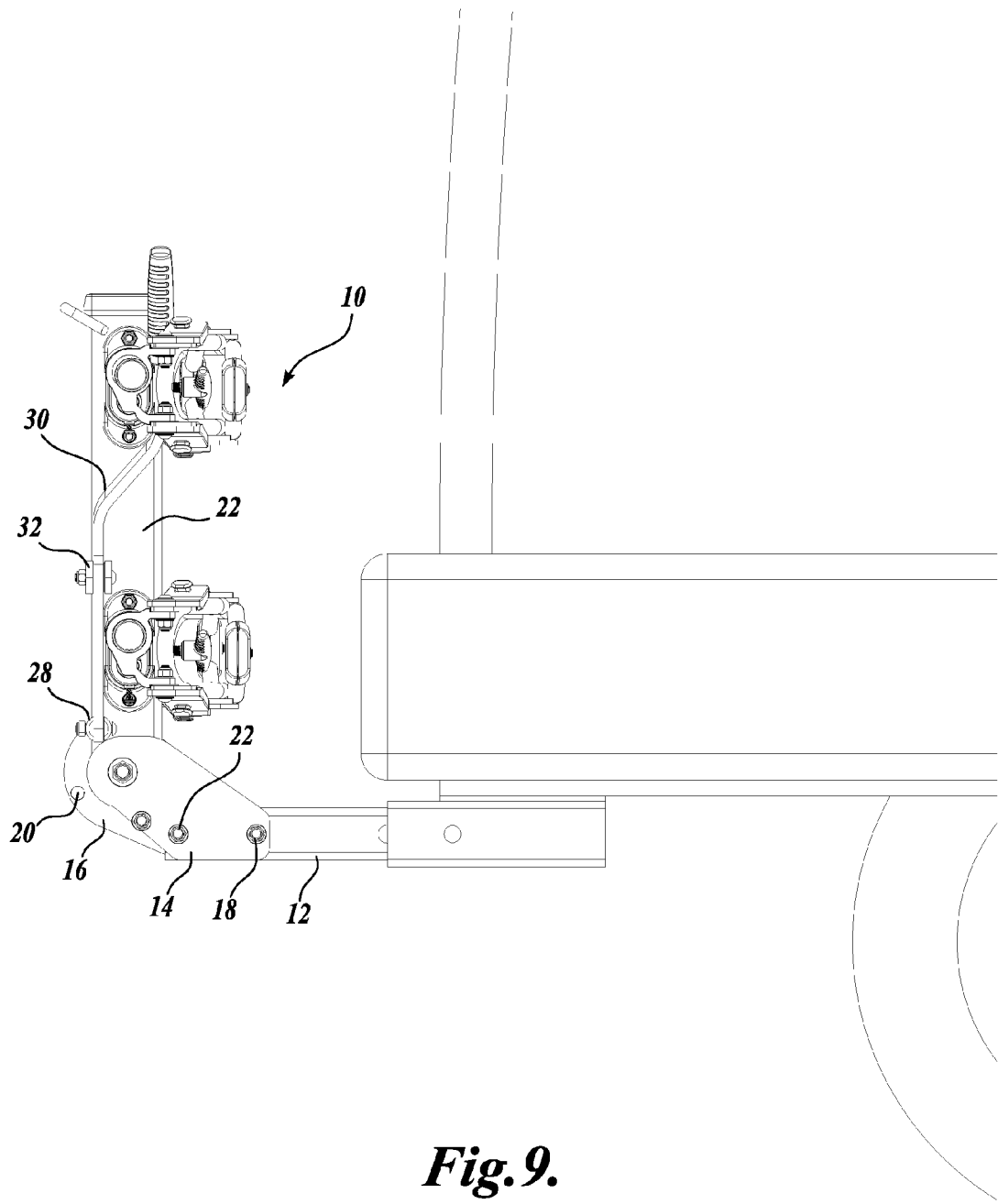
FIG. 9 is a side elevation view of the bicycle carrier of FIG. 7.

In operation, and assuming that carrier 10 is in its upwardly stored position such as shown in FIGS. 8 and 9, handle 30 is moved inwardly toward beam 22 thus causing lock pin 28 to move out of hole 44 allowing the carrier to pivot downwardly. If the handle is released during pivoting, spring 42 biases lock pin 28 against the inside surface of plate 16 until it reaches hole 44 where pin 28 automatically is pushed into hole 20 by spring 42 to lock beam 22 in its horizontal position.

With beam 22 in the horizontal position, loops 54 may be pivoted upwardly until the flat surfaces 63 of fittings 62 come in contact with flange 68 to prevent further rotation. Knobs 70 are then rotated counterclockwise to loosen the gripping pressure of curved plate 72 on the upper surfaces of associated tubes 36 as best seen in FIG. 13. Knob 70 includes a downwardly extending threaded portion 74 which runs through cooperatively threaded fitting 76 such that rotation of knob 70 moves curved plate 72 upwardly or downwardly. When the pressure of plate 72 is removed from tubes 36 they may be slid outwardly until the distance between associated loops such as 54*a* and 54*b* approximates the wheel span of a bicycle to be mounted thereon.

Curved plate 72 is shaped to contact tubes 36*a* and 36*b* such that when the knob 70 is tightened downwardly, the curved plate 72 forces the flat surfaces of the tubes together to prevent both rotation and sliding of the tubes with respect to each other.

In an alternative embodiment, it will be understood that tubes 36 or a single tube extending through beam 22, may be fixed in a laterally extending position and tubular mounts 56 may be adjusted along the tube to accommodate bicycles of varying size.

In still another embodiment, a knob actuated ratchet may be used to cause loops 54 to rotate upwardly to grip the wheels of a bicycle mounted on the carrier. The degree of rotation being used to accommodate bicycles of differing size.

It is also contemplated that the entire tube and loop arrangement could be replaced by a tray or trough cross-sectionally sized to accommodate a bicycle wheel and extending through a slot in beam 22 so as to hold both front and rear wheels of a bicycle. The wheels would be held in place by elastic straps or other conventional wheel gripping means. Other conventional means for gripping a bicycle may also be used.

A bicycle is then positioned such that its front and rear wheels extend between the arms of loops 54*a* and 54*b* (FIG. 5). The distance between loops 54*a*-*b* may be further adjusted to match the wheel span of the bicycle and to better hold the wheels in place, and knob 70 tightened to prevent further movement of tubes 36. Conventional elastic straps 78 may be mounted on buttons 80 of fittings 62 and looped over the bicycle wheels to hold the bicycle in place during travel. Other conventional means of holding the wheels in place during travel may be used alternatively. It is also contemplated that the tightening of a single strap about a wheel may be used to remove the need for a second loop to engage the other wheel of the bicycle which may simply be held in place in a trough with appropriate wheel gripping means.

Figure 12:
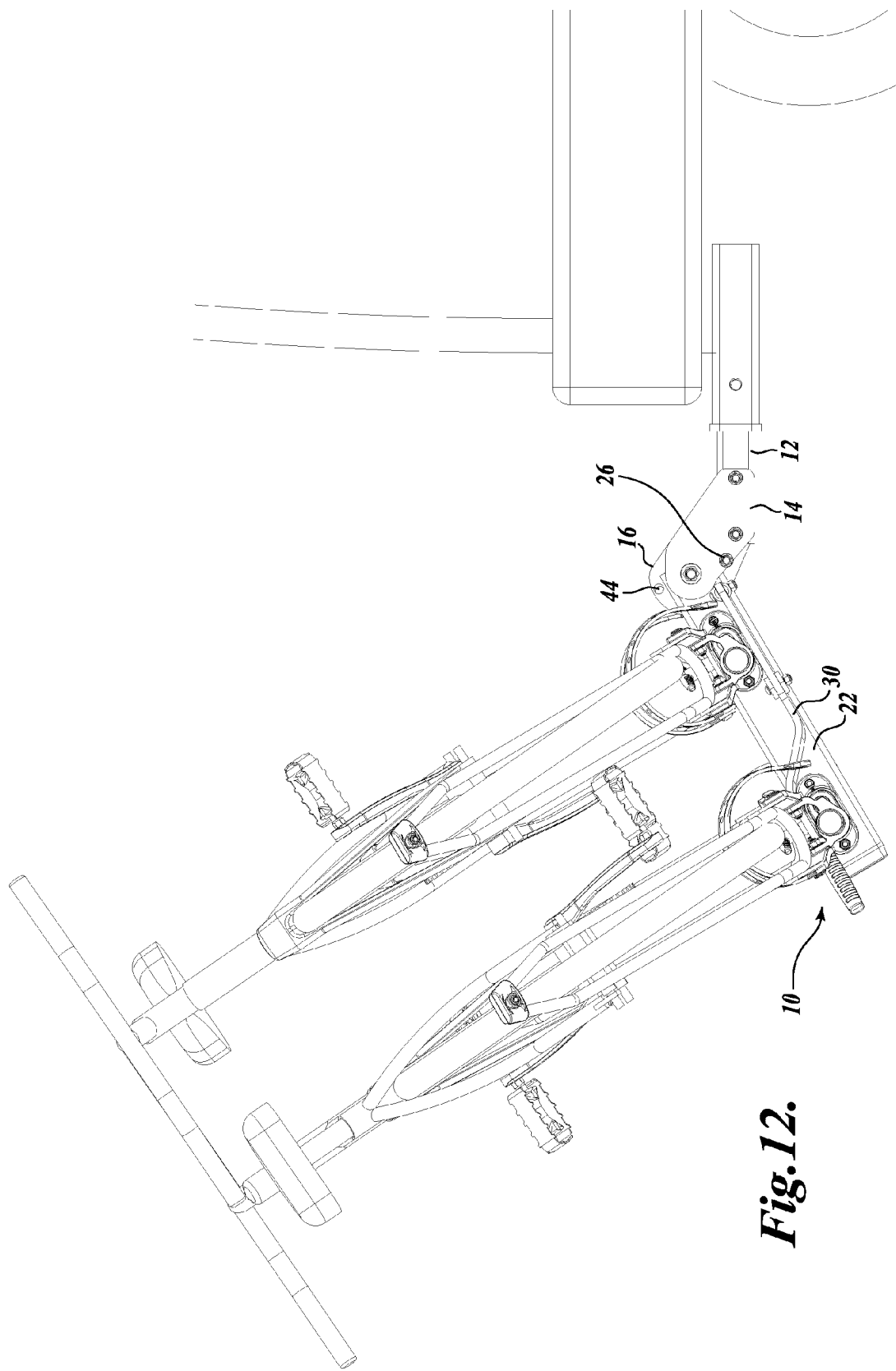
FIG. 12 is a side elevation view of the bicycle carrier of FIG. 5 in the downwardly tilted position.

Referring additionally to FIG. 12, if access to the rear doors of the carrying vehicle is desired, handle 30 may again be moved laterally inward to cause lock pin 28 to move out of hole 20 to allow the loaded carrier 10 to be tilted downwardly until beam 22 contacts stop bolt 26.

Referring now to FIGS. 18-22, a second embodiment of the present invention is disclosed wherein the bicycle support structures are replaced by a carrying rack 82 which is mounted in a conventional manner such as by bolts, rivets, or welding to the top surface of beam 22. It will be understood that support struts or gussets may extend outwardly from beam 22 beneath rack 82 to strengthen it for carrying heavy loads.

It may also be desirous to increase the length of beam 22 and handle 30 as compared to the embodiment of FIG. 1 in order to accommodate a larger rack.

Rack 82 includes a bottom surface 84 having raised stiffening ribs 86 spaced thereon. Upstanding sidewalls 88 provide depth to the rack and may include tie-down loops such as 90 or openings 92 through which rope or shock cords may be threaded to hold cargo in place on rack 82. In one embodiment, the carrying rack 82 may be formed of a single piece of metal meant to define sides. The rack may alternatively be formed of perforated steel or steel mesh to improve drainage of rain water. As illustrated, rack 82 provides drainage at the openings at the corners of the rack.

In another embodiment, bottom surface 84 may be formed of aluminum while the sidewalls are formed of steel, the bottom surface being interconnected with the sidewalls by means of screws. It is also contemplated that the bottom surface may be formed of plastic and pop riveted to the top surface of beam 22.

As will be understood, the tilting structure described above with respect to the first embodiment is identical in this second carrying rack embodiment and thus, the operation of the rack embodiment in pivoting from vertical to horizontal to tilting downwardly is also identical to that described above.

While the preferred embodiments of the invention have been illustrated and described, it will be appreciated that various changes obvious to a man skilled in the art can be made therein without departing from the spirit and scope of the invention.

The invention claimed is:

1. A hitch mounted carrier for a vehicle, comprising:
   a tubular hitch mount adapted to mate with a hitch receiver on the rear of a vehicle;
   a beam longitudinally aligned with said hitch mount and pivotally connected to said tubular hitch mount to pivot between a below horizontal position and an upright position; and
   a pair of rods extending transversely with respect to said beam, said pair of rods comprising:
      a first rod that slidably passes through said beam to extend laterally such that a proximal end of said first rod is disposed on an opposite side of said beam from a distal end of said first rod, the first rod mounted so that sliding the first rod through the beam adjusts the distance between the beam and the first bicycle wheel support and further comprising a first bicycle wheel support pivotally mounted to said distal end of said first rod; and
      a second rod that slidably passes through said beam to extend laterally such that a proximal end of said second rod is disposed on an opposite side of said beam from a distal end of said second rod, and further comprising a second bicycle wheel support pivotally mounted to said distal end of said second rod, the second rod mounted so that sliding the second rod through the beam adjusts the distance between the beam and the second bicycle wheel support.

2. The hitch mounted carrier of claim 1 wherein said beam is adapted to pivot to an upright position and a lock pin is adapted to releasably hold said beam in said upright position.

3. The hitch mounted carrier of claim 2, further comprising a pair of plates fixedly connected to said tubular hitch mount and extending rearwardly therefrom, one of said plates being shaped to extend beyond the other to define a non-overlapping portion, said non-overlapping portion including spaced openings adapted to receive said lock pin to selectively hold said beam in a horizontal or upright position.

4. The hitch mounted carrier of claim 3 including a handle pivotally mounted on said beam and having a first grip portion extending rearwardly and a second distal portion mounting said lock pin, wherein the lateral movement of said first grip portion causes said lock pin to move laterally relative to said non-overlapping portion of said plate.

5. The hitch mounted carrier of claim 4 wherein said handle comprises a lever to pivot said beam with respect to said tubular hitch mount.

6. The hitch mounted carrier of claim 1 wherein said pair of rods are adapted to slide laterally inwardly and outwardly with respect to said beam to adjust the lateral spacing between said bicycle wheel supports mounted thereon, and to slide inwardly such that substantially equal lengths of the pair of rods extend laterally outwardly to minimize the lateral size of said carrier.

7. The hitch mounted carrier of claim 6 wherein said pair of rods are mounted to prevent rotation of said first rod and of said second rod.

8. The hitch mounted carrier of claim 7 wherein said pair of rods each include at least one flat surface and extend through like shaped openings in said beam such that the flat surfaces of said rods prevent rotation thereof.

9. The hitch mounted carrier of claim 6 including releasable grip means to hold said pair of rods at a selected laterally extended position.

10. The hitch mounted carrier of claim 9 wherein said pair of rods are laterally adjacent each other and said releasable grip means includes a curved plate adapted to bear against said pair of rods to releasably lock them at a selected laterally extended position.

11. A hitch mounted carrier for a vehicle, comprising:
   a tubular hitch mount adapted to mate with a hitch receiver mounted on the rear of a vehicle;
   a plate extending rearwardly from said tubular hitch mount, said plate including spaced openings;
   a beam connected to said plate and extending rearwardly with respect to said tubular hitch mount, said beam adapted to pivot with respect to said hitch mount;
   a handle pivotally mounted on said beam having a spring lock pin on one end, wherein movement of said handle causes said lock pin to move into and out of said spaced openings as said beam is pivoted;
   said handle comprising a lever to pivot said beam upwardly and downwardly with respect to said hitch mount; and
   a pair of rods extending transversely with respect to said beam, said pair of rods comprising:
      a first rod that slidably passes through said beam to extend laterally such that a proximal end of said first rod is disposed on an opposite side of said beam from a distal end of said first rod, and further comprising a first bicycle wheel support mounted to said distal end of said first rod; the first rod mounted so that sliding the first rod through the beam adjusts the distance between the beam and the first bicycle wheel support and
      a second rod that slidably passes through said beam to extend laterally such that a proximal end of said second rod is disposed on an opposite side of said beam from a distal end of said second rod, and further comprising a second bicycle wheel support mounted to said distal end of said second rod the second rod mounted so that sliding the second rod through the beam adjusts the distance between the beam and the second bicycle wheel support.

* * * * *